(12) United States Patent
Iordanov et al.

(10) Patent No.: US 10,393,207 B2
(45) Date of Patent: Aug. 27, 2019

(54) DAMPER WITH POWER DRIVE ELECTRONICS

(71) Applicant: Tenneco Automotive Operating Company Inc., Lake Forest, IL (US)

(72) Inventors: Nikolay H. Iordanov, Burlington (CA); Craig Markyvech, Romulus, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 137 days.

(21) Appl. No.: 15/464,735

(22) Filed: Mar. 21, 2017

(65) Prior Publication Data

US 2018/0274622 A1    Sep. 27, 2018

(51) Int. Cl.
| | | |
|---|---|---|
| *F16F 9/34* | (2006.01) | |
| *F16F 9/32* | (2006.01) | |
| *H01F 7/18* | (2006.01) | |
| *H01H 47/04* | (2006.01) | |
| *B60G 13/08* | (2006.01) | |
| *B60G 17/015* | (2006.01) | |
| *B60G 17/08* | (2006.01) | |
| *F16F 9/46* | (2006.01) | |

(52) U.S. Cl.
CPC .......... *F16F 9/3292* (2013.01); *B60G 13/08* (2013.01); *B60G 17/0152* (2013.01); *B60G 17/08* (2013.01); *F16F 9/3242* (2013.01); *F16F 9/3257* (2013.01); *F16F 9/46* (2013.01); *H01F 7/1805* (2013.01); *H01H 47/04* (2013.01); *B60G 2202/24* (2013.01); *B60G 2206/0116* (2013.01); *B60G 2500/114* (2013.01); *F16F 2230/18* (2013.01)

(58) Field of Classification Search
CPC ....... H01F 7/1805; H01F 7/064; H01H 47/00; H01H 47/04; H01H 2047/008
USPC ................................... 361/152, 154
See application file for complete search history.

(56) References Cited

U.S. PATENT DOCUMENTS

| | | |
|---|---|---|
| 4,377,293 A | 3/1983 | Senoo |
| 4,867,475 A | 9/1989 | Groves |
| 4,890,858 A | 1/1990 | Blankenship |
| 5,088,762 A | 2/1992 | Fukuyama et al. |
| 5,383,679 A | 1/1995 | Nakamura et al. |
| 5,653,315 A | 8/1997 | Ekquist et al. |
| 5,731,946 A * | 3/1998 | Kahr .................. F01L 9/04 361/154 |
| 5,892,650 A * | 4/1999 | Kinoshita ............ B60T 8/36 361/152 |

(Continued)

*Primary Examiner* — Nicholas J Lane
(74) *Attorney, Agent, or Firm* — Harness, Dickey & Pierce, P.L.C.

(57) ABSTRACT

A damper system may include an electrically adjustable hydraulic shock absorber having an electromechanical valve and a damper controller. The damper controller may include a solenoid driver circuit electrically coupled to the electromechanical valve, and disposed at the shock absorber. The solenoid driver circuit may be operable to drive the electromechanical valve in an open state in which hydraulic fluid flows between a pressure tube and a reserve tube. The solenoid driver circuit may include a plurality of transistors that are operable to generate a first current to place the electromechanical valve in the open state and a second current less than the first current to hold the electromechanical valve in the open state.

19 Claims, 3 Drawing Sheets

(56) References Cited

U.S. PATENT DOCUMENTS

| | | | | |
|---|---|---|---|---|
| 6,142,124 A | * | 11/2000 | Fischer | F02D 41/20 |
| | | | | 123/490 |
| 6,209,513 B1 | * | 4/2001 | Sakasai | F02D 41/20 |
| | | | | 123/299 |
| 6,683,777 B2 | * | 1/2004 | Shimoida | H03K 17/08126 |
| | | | | 361/152 |
| 8,042,818 B2 | | 10/2011 | Yamawaki et al. | |
| 8,935,047 B2 | | 1/2015 | Sekiya | |
| 9,163,691 B2 | | 10/2015 | Roessle et al. | |
| 9,217,483 B2 | | 12/2015 | Dunaway et al. | |
| 9,399,383 B2 | | 7/2016 | Blankenship et al. | |
| 2003/0038221 A1 | | 2/2003 | Fu et al. | |
| 2005/0135040 A1 | * | 6/2005 | Suzuki | H01H 47/04 |
| | | | | 361/160 |
| 2008/0290624 A1 | | 11/2008 | Yamanaka et al. | |
| 2009/0027823 A1 | * | 1/2009 | Follic | H01F 7/1833 |
| | | | | 361/153 |
| 2012/0267204 A1 | * | 10/2012 | Takeuchi | B60G 13/02 |
| | | | | 188/267 |
| 2014/0238797 A1 | * | 8/2014 | Blankenship | B60G 13/00 |
| | | | | 188/314 |
| 2015/0015998 A1 | * | 1/2015 | Bowman | H02H 7/08 |
| | | | | 361/31 |
| 2015/0247544 A1 | | 9/2015 | Hall et al. | |
| 2016/0082803 A1 | | 3/2016 | Dunaway et al. | |
| 2016/0332499 A1 | | 11/2016 | Blankenship et al. | |

\* cited by examiner

DAMPER WITH POWER DRIVE ELECTRONICS

FIELD

The present disclosure relates to a hydraulic damper or shock absorber for use in a suspension system of a vehicle. More particularly, the present disclosure relates to a damper having an integrated electronic system.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile.

In recent years, vehicles have been equipped with an electrically adjustable damping system that includes an electrically adjustable hydraulic shock absorber. Such adjustable shock absorbers may include an electromechanical valve/actuator and a damper controller for controlling the damping state of the shock absorber. Specifically, the damper controller actuates the electromechanical (EM) valve to control the flow of hydraulic fluid and, thus, to control the dampening provided by the shock absorber.

The damper controller can be configured as a printed circuit board that is arranged within, for example, a bumper cap of the shock absorber. While such arrangement allows the damper controller to be close to the EM valve, the packaging size of the controller is restricted.

The damper controller can include a solenoid driver circuit that applies a current to the EM valve to control the state of the valve (i.e., open state or closed state). To place an EM valve in an open state, the solenoid driver circuit drives the EM valve with a peak maximum latching current (e.g., 1.0 amps). After the EM valve is placed in the open state, the damper controller may apply a lower current (e.g., 0.1 amps) to maintain the valve in the open state. Such lower current may be referenced as a hold current. It is common for the EM valve to remain in the open state for long periods of time (e.g., 15-30 mins) and, therefore, the amount of current supplied to the EM valve must be closely monitored to prevent, for example, the EM valve from unlatching due to a low current or the damper controller from overheating due to a high current.

SUMMARY

This section provides a general summary of the disclosure, and is not a comprehensive disclosure of its full scope or all of its features.

The present disclosure is directed toward a damper system for a vehicle. The system may include an electrically adjustable hydraulic shock absorber, and an integrated electronic system. The electrically adjustable hydraulic shock absorber may include a rod guide assembly, a pressure tube, a reserve tube, and an electromechanical valve. The electromechanical valve may be disposed within the electrically adjustable hydraulic shock absorber. The integrated electronic system may have power drive electronics electrically coupled to the electromechanical valve. The power drive electronics may include at least two transistors that are operable to actuate the electromechanical valve from a first state to a second state. In operating the electromechanical valve to the second state, each of the at least two transistors may output current to generate a first current during a first mode of the second state, and one of the at least two transistors may cease to output current to generate a second current less than the first current during a second mode of the second state.

In another aspect, the present disclosure is directed toward a damper system that may include an electrically adjustable hydraulic shock absorber and a damper controller. The electrically adjustable hydraulic shock absorber may include a rod guide assembly, a pressure tube, a reserve tube, and an electromechanical valve. The electromechanical valve may be disposed within the electrically adjustable hydraulic shock absorber. The damper controller may include a solenoid driver circuit electrically coupled to the electromechanical valve, and disposed at the shock absorber. The solenoid driver circuit may be operable to drive the electromechanical valve in an open state in which hydraulic fluid flows between the pressure tube and the reserve tube. The solenoid driver circuit may include a plurality of transistors that are operable to generate a first current to place the electromechanical valve in the open state and a second current less than the first current to hold the electromechanical valve in the open state.

In yet another aspect, the present disclosure is directed toward a damper system that may include an electrically adjustable hydraulic shock absorber and a damper controller. The electrically adjustable hydraulic shock absorber may include a rod guide assembly, a pressure tube, a reserve tube, and an electromechanical valve. The electromechanical valve may be disposed within the electrically adjustable hydraulic shock absorber and may be operable in a closed state to prevent flow of hydraulic fluid between the pressure tube and the reserve tube, and an open state to allow flow of hydraulic fluid between the pressure tube and the reserve tube. The damper controller may include a damper control module and a solenoid driver circuit electrically coupled to the electromechanical valve. The damper controller may be disposed at the shock absorber. The damper control module may control the electromechanical valve by way of the solenoid driver circuit. The solenoid driver circuit may include a plurality of transistors that are operable to generate a first current to place the electromechanical valve in the open state and a second current less than the first current to hold the electromechanical valve in the open state. The damper control module may output a drive control signal to the solenoid driver circuit, and the solenoid driver circuit may control the at least two transistors to apply one of the first current or the second current to the electromechanical valve based on the drive control signal.

Further areas of applicability will become apparent from the description provided herein. The description and specific examples in this summary are intended for purposes of illustration only, and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

A solenoid driver (i.e., power drive electronics), which is disposed at the shock absorber with the damper controller, is configured to not only drive the electromagnetic (EM) valve with the necessary current to control the state of the valve, but to also accurately monitor the hold current when the EM valve is maintained in the open state. Specifically, if the hold current is too low due to, for example, feedback error, then the valve may unlatch causing an unexpected shock performance characteristic. On the other hand, if the hold current is too high, then the valve will waste energy and may generate heat that increases the temperature of the components housed with the driver circuit.

One type of solenoid driver includes a single transistor (e.g., field effect transistor) that is used to supply current to the EM valve. While such drivers are efficient in supplying the peak maximum current to latch the valve, the driver does not accurately monitor the holding current and can have an error of, for example, +/−28%. To address the possible fluctuation in the holding current, additional electronic components, such as amplifiers and shunt resistors, can be used with the solenoid driver. However, these added components increase the size of the damper controller, which is allocated a limited amount of space at the shock absorber.

The present disclosure is directed toward a damper controller having a solenoid driver circuit that generates the peak maximum current and that accurately monitors the hold current, so that a sufficient amount of current is being applied to hold the EM valve in the open state. More particularly, the solenoid driver circuit of the present disclosure includes multiple transistors that individually have lower current output than that of the single transistor solenoid driver, but when operated together provide sufficient peak current to place the EM valve in the open state. For example, to place the EM valve in the open state, the damper controller operates the transistors in parallel to output the peak maximum current and, to maintain the EM valve in the open state, the damper controller operates one of the multiple transistors to output the hold current. As discussed further herein, the multiple transistor solenoid driver circuit accurately monitors the hold current within +/−5% error and, therefore, the risk of providing a holding current that is too low or too high is significantly reduced and the size of the damper controller can be controlled, since no additional electronic components are needed.

Figure 1:
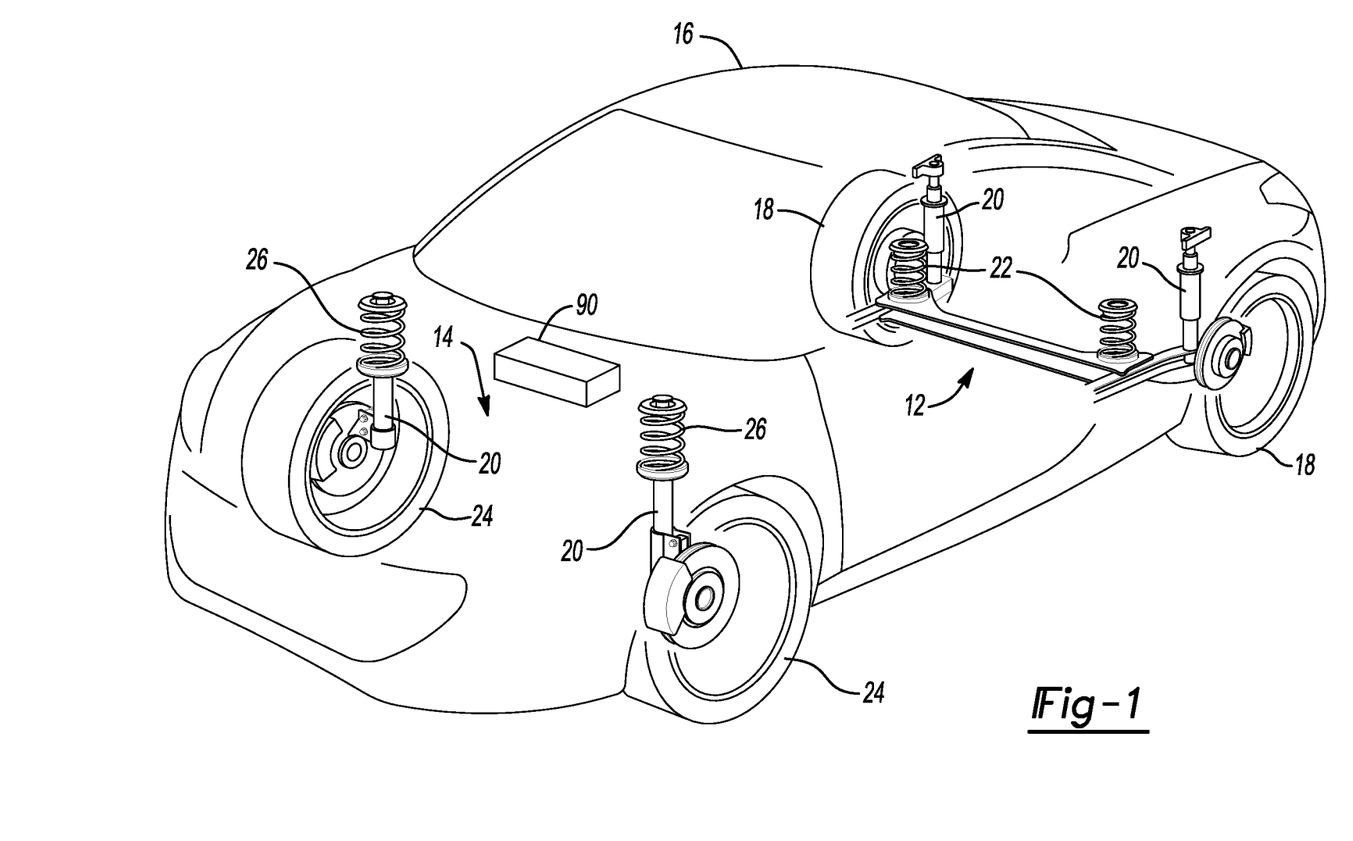
FIG. 1 is an illustration of a vehicle having a damper system which incorporates an electrically adjustable hydraulic shock absorber and a damper controller in accordance with the present disclosure.

The present disclosure will now be described more fully with reference to the accompanying drawings. With reference to FIG. 1, an example of a vehicle 10 incorporating a suspension system having dampers with an integrated electronic system is now presented. The vehicle 10 includes a rear suspension 12, a front suspension 14, and a body 16. The rear suspension 12 has a transversely extending rear axle assembly (not shown) adapted to operatively support a pair of rear wheels 18. The rear axle assembly is attached to the body 16 by means of a pair of damper systems 20 and by a pair of springs 22. Similarly, the front suspension 14 includes a transversely extending front axle assembly (not shown) to operatively support a pair of front wheels 24. The front axle assembly is attached to the body 16 by means of a pair of the damper systems 20 and by a pair of springs 26.

The damper systems 20 serve to dampen the relative motion of the unsprung portion (i.e., front and rear suspensions 12, 14) with respect to the sprung portion (i.e., body 16) of the vehicle 10. While the vehicle 10 has been depicted as a passenger car having front and rear axle assemblies, the damper system 20 may be used with other types of vehicles or in other types of applications including, but not limited to, vehicles incorporating non-independent front and/or non-independent rear suspensions, vehicles incorporating independent front and/or independent rear suspensions, or other suspension systems known in the art. In addition, the damper system 20 may also be used on all wheeled and/or tracked vehicles. For example, the damper system 20 may be used on two and/or three-wheeled types of vehicles, such as motorcycles and all-terrain vehicles.

Figures 2, 3:
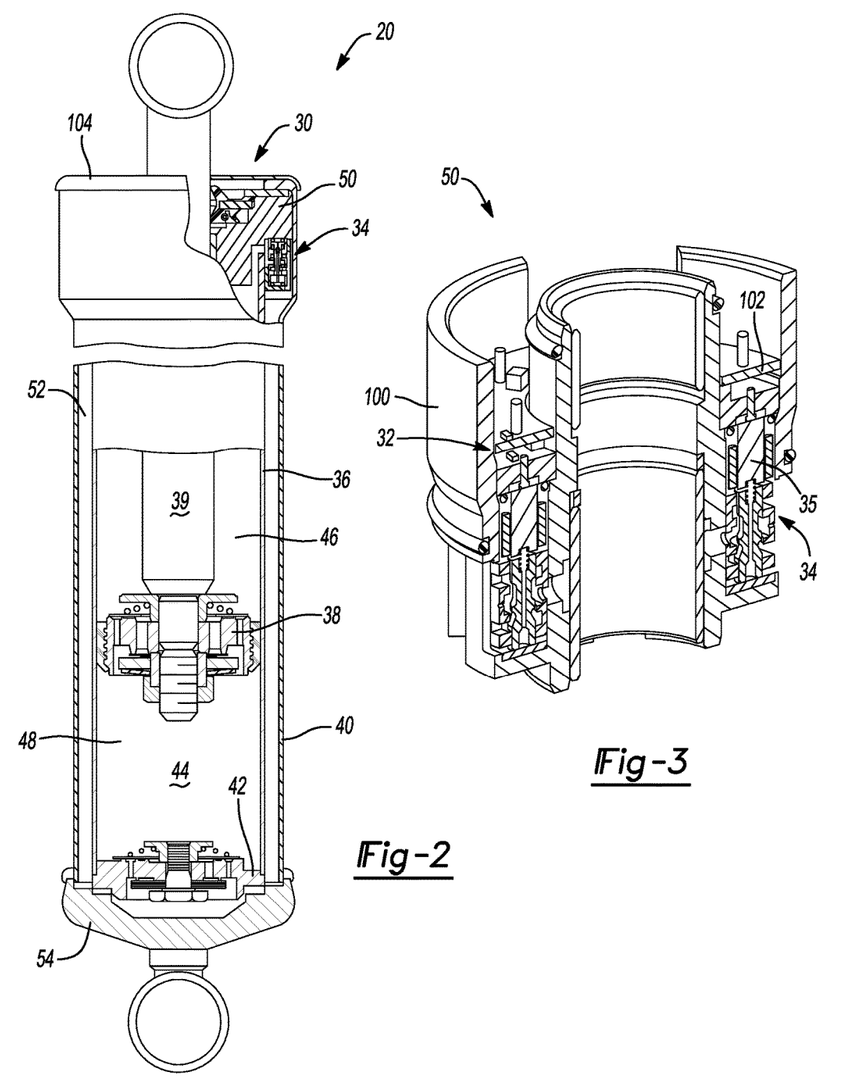
FIG. 2 is a partial cross-sectional view of the shock absorber of the damper system.
FIG. 3 is a cross-sectional view of a rod guide assembly having a printed circuit board assembly disposed within the shock absorber.

Referring now to FIG. 2, an example of the damper system 20 is shown in greater detail. The damper system 20 includes an electrically adjustable hydraulic shock absorber 30 ("shock absorber 30" hereinafter) and a damper controller 32. The shock absorber 30 may have a twin tube configuration, and may include a pressure tube 36, a piston assembly 38, a piston rod 39, a reserve tube 40, and a base valve assembly 42.

In the example embodiment described herein, the damper system 20 is described and depicted as including a twin tube electrically adjustable shock absorber. It is readily understood that the damper system 20 may include other types of electrically adjustable hydraulic shock absorber and is not limited to the shock absorber described herein. For example, the damper system 20 may include an electrically adjustable shock absorber having a mono-tube configuration, a triple-tube configuration, or any other suitable shock absorber design known in the art. Furthermore, in the following description, the shock absorber is connected to the sprung and unsprung portions of the vehicle as a non-inverted shock absorber. It is readily understood that the present disclosure is further applicable to inverted shock absorbers, which differ in the manner in which it is connected to the sprung and unsprung portions of vehicle.

The pressure tube 36 defines a working chamber 44. The piston assembly 38 is slidably disposed within the pressure tube 36 and divides the working chamber 44 into an upper working chamber 46 and a lower working chamber 48.

The piston rod 39 is attached to the piston assembly 38 and extends through the upper working chamber 46 and through a rod guide assembly 50 which closes the upper end of the pressure tube 36. The end of the piston rod 39 opposite to the piston assembly 38 is adapted to be secured to the sprung mass of the vehicle 10.

Valving within the piston assembly 38 controls the movement of fluid between the upper working chamber 46 and the lower working chamber 48 during movement of the piston assembly 38 within the pressure tube 36. Since the piston rod 39 extends through the upper working chamber 46 and not the lower working chamber 48, movement of the piston assembly 38 with respect to the pressure tube 36 causes a difference in the amount of fluid displaced in the upper working chamber 46 and the amount of fluid displaced in the lower working chamber 48. The fluid displaced may flow through the base valve assembly 42, the piston assembly 38, or a combination thereof.

The reserve tube 40 surrounds the pressure tube 36 to define a fluid reservoir chamber 52 located between tubes 40 and 36. The bottom end of the reserve tube 40 is closed by a base cup 54 which can be connected to the unsprung mass of vehicle 10. The upper end of reserve tube 40 is attached to the rod guide assembly 50. The base valve assembly 42 is disposed between the lower working chamber 48 and the reservoir chamber 52 to control the flow of fluid between chambers 48 and 52. When the shock absorber 30 extends in length, an additional volume of fluid is needed in the lower working chamber 48. Thus, fluid may flow from the reservoir chamber 52 to the lower working chamber 48 through, for example, the base valve assembly 42. When the shock absorber 30 compresses in length, an excess of fluid must be removed from the lower working chamber 48 and, therefore, fluid may flow from the lower working chamber 48 to the reservoir chamber 52 through the base valve assembly 42, the piston assembly 38, or a combination thereof.

The shock absorber 30 may include one or more electromechanical (EM) valves 34. The EM valve 34 may be a digital valve, a variable state valve, or other suitable electromechanical valve. Each of the EM valves 34 includes a solenoid 35 (FIG. 3) that controls the actuation of the EM valve 34. For example, when power is supplied to the EM valve 34, the solenoid 35 creates a magnet field that actuates the EM valve 34, and the actuation of the EM valve 34 controls the flow of fluid within the shock absorber 30. Once the EM valve 34 is in the open state, the valve 34 can be maintained in such state by applying a hold current to the solenoid 35 in the EM valve 34. The hold current is substantially smaller than a peak current required to initially latch the EM valve 34 in the open state.

With reference to FIG. 3, an example of the damper controller 32 and the EM valve 34 is presented. Each damper system 20 includes the damper controller 32 that controls the operation of the shock absorber 30, as described in further detail below. The damper controller 32 is disposed at the rod guide assembly 50 in a housing 100 as an integrated electronic system. For example, the damper controller 32 is provided as a printed circuit board assembly (PCBA) 102 that is positioned between a bumper cap 104 (FIG. 2) and the EM valve 34. The PCBA 102 may receive power from a vehicle battery. For example, a voltage regulator may be used to condition the electrical power from the vehicle battery to a voltage level suitable for the components on the PCBA 102.

Figure 4:
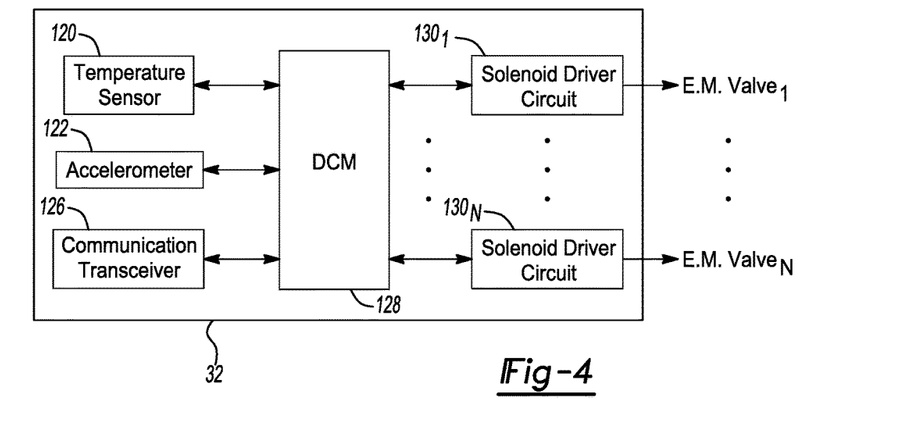
FIG. 4 is an example functional block diagram of the damper module for controlling electromagnetic valves within the shock absorber.

With reference to FIG. 4, an example of the damper controller 32 is now presented. In an example embodiment, the damper controller 32 includes a temperature sensor 120, an accelerometer 122, a communication transceiver 126, a damper control module (DCM) 128, and one or more solenoid driver circuits 130 (e.g., $130_1$ to $130_N$). The solenoid driver circuits may also be referred to as power drive electronics. While the damper controller 32 is described as including the above components, it should be readily understood that the controller 32 may include other suitable components.

The temperature sensor 120 detects the ambient temperature of the PCBA 102, and the accelerometer 122 measures the acceleration at the shock absorber 30. The communication transceiver 126 communicably couples the damper controller 32 to a vehicle communication network (e.g., CAN or LIN) to allow the damper controller 32 to communicate with a main vehicle controller 90 (FIG. 1) and/or other modules in the vehicle. Alternatively, the damper control module 128 may autonomously function without communicating to devices outside of damper controller 32.

Using the information from the sensors and the transceiver 126, the damper control module 128 determines a control operation for operating the shock absorber 30 at a target damping state. The control operation may identify which of the EM valves 34 are to be operated in the open state or the closed state. For the EM valves 34 that are to be in the open state, the damper control module 128 outputs a drive control signal to the solenoid driver circuit 130 associated with the given EM valve 34.

Specifically, to place a given EM valve in the open state, the damper control module 128 may operate the solenoid driver circuit 130 in an actuation mode to place the EM valve 34 in the open state from the closed state and in a hold mode in which the EM valve 34 is maintained in the open state to allow flow of fluid. In the example embodiment, the damper control module 128 is configured to determine the peak current for the actuation mode and the hold current for the hold mold based on, for example, the temperature of the damper controller 32, the resistance of the solenoid 35, the voltage being supplied from the battery, and on time. More particularly, the resistance of the solenoid 35 varies based on temperature, and thus, the energy needed to actuate the EM 34 also varies. In the example embodiment, the damper control module 128 may determine the resistance using a pre-stored look-up table that associates different temperatures with solenoid resistances. The voltage supplied by the battery may also vary (e.g., between 9-16V), and therefore, the damper control module 128 may measure the supply voltage.

Using the determined solenoid resistance, the measured voltage, and pre-stored algorithms, the damper control module 128 calculates the peak current for latching the EM valve 34 and the hold current for maintaining the EM valve 34 in the latch state. For example, the peak current can be a latching pulse of 4 amps for 5 ms, 2 amps for 10 ms, or other suitable pulse that provide sufficient energy. It should be readily understood that the damper control module 128 may be configured in various suitable ways to determine the peak current and the hold current, and should not be limited to the example provided herein.

The number of solenoid driver circuits 130 is dependent on the number of EM valves 34 in the shock absorber. For example, in the example embodiment, one solenoid driver circuit 130 is provided for each EM valve 34. Based on the drive control signal, the solenoid driver circuit 130 generates a drive current that is applied to the solenoid 35 of the EM valve 34.

Figure 5:
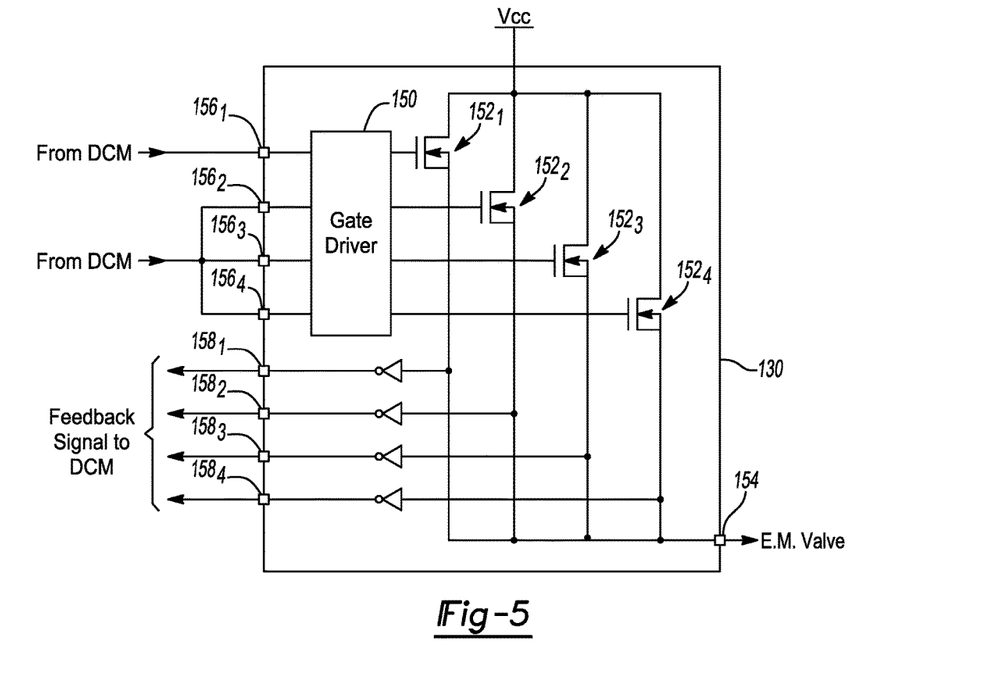
FIG. 5 is a schematic of a solenoid driver circuit that outputs a drive current to a respective electromagnetic valve.

With reference to FIG. 5, an example of the solenoid driver circuit 130 of the present disclosure is provided. In the example embodiment, the solenoid driver circuit 130 includes a gate driver 150 and four transistors 152 (i.e., $152_1$, $152_2$, $152_3$, and $152_4$). The transistors 152 are provided as n-channel field effect transistors (FET) and have their gate terminals (i.e., control terminal) connected to the gate driver 150, their drain terminals connect to a voltage (e.g., Vcc), and their source terminals connected to an output terminal 154 of the solenoid driver circuit 130. While the solenoid driver circuit 130 is described as having four transistors, the driver circuit may have two or more transistors and should not be limited to four.

As known in the art, when a voltage is applied to the n-channel transistor 152, the transistor 152 operates as a closed switch to allow current to flow between the drain and the source terminals. On the other hand, with no voltage, the transistor 152 operates as an open switch preventing current from flowing between the drain and the source terminals. In the following, a transistor 152 that is identified as being in an ON-state has current flowing between the drain and source terminals, and a transistor 152 that is identified as being an OFF-state has no current flowing between the drain and the source terminals.

In the example embodiment, the solenoid driver circuit 130 is operable to output a peak current during the actuation mode in which the EM valve 34 is actuated to the open state from the closed state, and a hold current during the hold mode in which the EM valve 34 is maintained in the open state. The solenoid driver circuit 130 is configured to have one of the transistors 152 operate as a primary current source for supplying current during both the actuation mode and the hold mode, and the other transistors 152 operate as a supplementary current source for supplying current during the actuation mode. In the example embodiment, the transistor $152_1$ is configured as the primary current source and the transistors $152_2$, $152_3$, and $152_4$ are configured as the supplementary current source.

In the example embodiment, for each of the transistors 152, the solenoid driver circuit 130 includes an input terminal 156 ($156_1$, $156_2$, $156_3$, and $156_4$) and a feedback terminal 158 ($158_1$, $158_2$, $158_3$, and $158_4$). The input terminal, the feedback terminal, and the transistor which are associated with one another have the same corresponding subscript. For example, the transistor $152_1$ is associated with the input terminal $156_1$ and the feedback terminal $158_1$.

The solenoid driver circuit 130 is configured to receive the drive control signal from the damper control module 128 by way of the input terminals 156. When a given input terminal receives the drive control signal, the gate driver 150 is configured to control the respective transistor in the ON-state.

The solenoid driver circuit 130 outputs a feedback signal that is indicative of the electrical current being applied to the EM valve 34 to the damper control module 128 by way of the feedback terminal. The damper control module 128 can monitor the electrical current levels to determine the state of the EM valve 34 and to insure that the EM valve 34 is receiving sufficient current for maintaining the valve 34 in the open state during the hold mode. The damper control module 128 may also compare the electrical current level to predetermined limits to ensure the solenoid driver circuit 130 is not experiencing a fault, such as a short circuit, open circuit, temperature extreme, or other fault.

In the example embodiment, the damper control module 128 monitors the current outputted by each transistor 152. Alternatively, the damper controller may be configured such that the module 128 only monitors the primary current source (e.g., transistor 152). For example, the drive signal may be a high voltage signal +5V and the gate driver may apply a voltage to the gate terminal of the transistor 152 associated with the input terminal that received the signal.

In operation, when a given EM valve is to be placed in the open state from the closed state, the damper control module 128 operates the solenoid driver circuit 130 in the actuation mode and outputs the drive control signal to each of the input terminals 156. The drive control signal, as a high voltage signal, is received by the gate driver 150 for each of the input terminals 156 and, in response to the high voltage signal, the gate driver 150 outputs a voltage to the gate terminals of each of the transistors 152 placing the transistors 152 in the ON-state. Current from each of the transistors 152 forms the peak current which is output to the solenoid 35 in the EM valve 34 to place the EM valve 34 in the open state.

Based on the feedback signal from the solenoid driver circuit 130, the damper control module 128 may determine when the EM valve 34 is in the open state. For example, the damper control module 128 may monitor the feedback signal to detect a dip in the current, which indicates that the EM valve 34 is in the open state. After the EM valve 34 is in the open state, the peak current is no longer required and the EM valve 34 can be maintained in the open state with the smaller hold current. Accordingly, the damper control module 128 operates the solenoid driver circuit 154 in the hold mode by outputting the drive control signal to the input terminal $156_1$ for the transistor $152_1$, and not for the other transistors $152_2$, $152_3$, and $152_4$. Thus, with the high voltage signal only being received at the input terminal $156_1$, the gate driver 150 continues to apply a voltage to the gate terminal of transistor $152_1$ and stops applying current to the gate terminals of the other transistors $152_2$, $152_3$, and $152_4$. Accordingly, only transistor $152_1$ is outputting current to the EM valve 34.

When the damper control module 128 determines that the EM valve 34 should be in the closed state, the module 128 does not output the drive control signal to any of the input terminals 156 of the solenoid driver circuit 130. Accordingly, the gate driver 150 stops applying voltage to, for example, transistor $152_1$ and no current is outputted to EM valve 34, thus closing the EM valve 34.

To effectively control the EM valve, the solenoid driver circuit is operable to not only apply the high peak current to initially place the EM valve in the open state, but is also operable to supply an accurate current feedback signal to the damper control module which is used to monitor the hold current. In particular, the current sense error for a single high power transistor is typically higher than that of multiple low power transistors. Thus, by using multiple transistors, the damper controller accurately operates the solenoid driver circuit in the hold mode.

Furthermore, the damper controller is an integrated electronic system disposed with the damper system to electrically actuate the EM valves and, thus, adjust the damping characteristic of the shock absorber. In essence, each damper system includes its own power drive electronics for controlling the damping state of the shock absorber. Since the damper controller is disposed with the shock absorber, the packing size of the controller is restricted. While a single transistor solenoid driver circuit can be used, such driver circuit would require additional components to address the accuracy deficiency of the driver circuit, thereby increasing the size of the controller. By way of contrast, the multiple transistor solenoid driver circuit of the present disclosure operates the EM valve in the two modes without the added circuitry, thus maintaining the small packaging size of the damper controller.

In the example embodiment, only one transistor is turned ON to generate the hold current during the hold mode. Alternatively, more than one transistor may be used to generate the hold current. For example, the damper controller may be configured to have transistors $152_1$ and $152_2$ as the primary current source for generating the hold current during the hold mode. Therefore, the number of transistors used to generate the hold current may be greater than or equal to one but less than the total number of transistors provided in the solenoid driver circuit.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element is referred to as being "on," "engaged to," "connected to," or "coupled to" another element, it may be directly on, engaged, connected or coupled to the other element, or intervening elements may be present. In contrast, when an element is referred to as being "directly on," "directly engaged to," "directly connected to," or "directly coupled to" another element, there may be no intervening elements present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A damper system for a vehicle comprising:
    an electrically adjustable hydraulic shock absorber including a rod guide assembly;
    a pressure tube, a reserve tube, and an electromechanical valve, wherein the electromechanical valve is disposed within the electrically adjustable hydraulic shock absorber; and
    an integrated electronic system having power drive electronics electrically coupled to the electromechanical valve, the power drive electronics including at least two transistors that are operable to actuate the electromechanical valve from a first state to a second state, wherein, in operating the electromechanical valve to the second state,
        each of the at least two transistors outputs current to generate a first current during a first mode of the second state, and
        when a decrease in current through the electromechanical valve occurs, one of the at least two transistors is switched open to generate a second current less than the first current during a second mode of the second state.

2. The damper system of claim 1 wherein the at least two transistors includes four transistors, and in the first mode, the four transistors are closed to generate the first current and in the second mode, only one of the four transistors outputs current and the other ones of the four transistors are switched open to generate the second current.

3. The damper system of claim 1, wherein the integrated electronic system includes a microcontroller that outputs a drive control signal to the power drive electronics, and the power drive electronics controls the at least two transistors based on the drive control signal.

4. The damper system of claim 3, wherein the power drive electronics outputs a feedback signal to the microcontroller, wherein the feedback signal is indicative of the current applied to the electromechanical valve.

5. The damper system of claim 1, wherein the electrically adjustable hydraulic shock absorber includes a plurality of the electromechanical valves, and the integrated electronic system includes a plurality of the power drive electronics, wherein one of the power drive electronics is electrically coupled to one of the plurality of the electromechanical valves.

6. The damper system of claim 1, wherein the first current of the first mode latches the electromechanical valve in an open state to have hydraulic fluid flow between the pressure tube and the reserve tube, and the second current of the second mode holds the electromechanical valve in the open state.

7. The damper system of claim 1 wherein the electrically adjustable hydraulic shock absorber includes a cap, the integrated electronic system being disposed beneath the cap.

8. The damper system of claim 1, wherein the integrated electronic system comprises a printed circuit board assembly.

9. The damper system of claim 1, wherein, in the second state, the electromechanical valve is open to have hydraulic fluid flow between the pressure tube and the reserve tube.

10. The damper system of claim 1, wherein the at least two transistors are field effect transistors.

11. A damper system comprising:
    an electrically adjustable hydraulic shock absorber including a rod guide assembly, a pressure tube, a reserve tube, and an electromechanical valve, wherein the electromechanical valve is disposed within the electrically adjustable hydraulic shock absorber; and
    a damper controller including a solenoid driver circuit electrically coupled to the electromechanical valve, the damper controller disposed at the shock absorber, the solenoid driver circuit being operable to drive the electromechanical valve in an open state in which hydraulic fluid flows between the pressure tube and the reserve tube, wherein the solenoid driver circuit includes a plurality of transistors, wherein the solenoid driver circuit is configured to close all of the transistors to generate a first current to place the electromechanical valve in the open state and to, when a decrease in current through the electromechanical valve occurs, open all but one of the transistors to generate a second current less than the first current to hold the electromechanical valve in the open state.

12. The damper system of claim 11, wherein the damper controller includes a microcontroller that outputs a drive control signal to the solenoid driver circuit, and the solenoid driver circuit controls the transistors based on the drive control signal.

13. The damper system of claim 12, wherein the solenoid driver circuit outputs a feedback signal to the microcontroller, wherein the feedback signal is indicative of the current applied to the electromechanical valve.

14. The damper system of claim 12, wherein:
the microcontroller outputs a first set of drive control signals to the solenoid driver circuit to drive the electromechanical valve with the first current and outputs a second set of drive control signals different from the first set of drive control signals to the solenoid driver circuit to drive the electromechanical valve with the second current.

15. The damper system of claim 11, wherein the electrically adjustable hydraulic shock absorber includes a plurality of the electromechanical valves, and the damper controller includes a plurality of the solenoid driver circuits, wherein one of the solenoid driver circuits is coupled to one of the electromechanical valves.

16. The damper system of claim 11, further comprising:
a cap, wherein the cap is attached to an end of the shock absorber, and the damper controller is disposed between shock absorber and the cap.

17. The damper system of claim 11, wherein the solenoid driver circuit includes four transistors as the plurality of transistors.

18. A damper system comprising:
an electrically adjustable hydraulic shock absorber including a rod guide assembly, a pressure tube, a reserve tube, and an electromechanical valve, wherein the electromechanical valve is disposed within the electrically adjustable hydraulic shock absorber and is operable in a closed state to prevent flow of hydraulic fluid between the pressure tube and the reserve tube, and an open state to allow flow of hydraulic fluid between the pressure tube and the reserve tube; and
a damper controller including a damper control module and a solenoid driver circuit electrically coupled to the electromechanical valve, wherein:
the damper controller is disposed at the shock absorber;
the damper control module controls the electromechanical valve by way of the solenoid driver circuit,
the solenoid driver circuit includes a plurality of transistors and is configured to close all of the transistors to generate a first current to place the electromechanical valve in the open state and to, when a decrease in current through the electromechanical valve occurs, open all but one of the transistors to generate a second current less than the first current to hold the electromechanical valve in the open state, and
the damper control module outputs a drive control signal to the solenoid driver circuit, and the solenoid driver circuit controls the transistors to apply one of the first current or the second current to the electromechanical valve based on the drive control signal.

19. The damper system of claim 18, wherein:
the damper control module outputs a first set of drive control signals to the solenoid driver circuit to drive the electromechanical valve with the first current,
the damper control module outputs a second set of drive control signals different from the first set of drive control signals to the solenoid driver circuit to drive the electromechanical valve with the second current,
the solenoid driver circuit closes each of the plurality of transistors in response to the first set of drive control signals, and
the solenoid driver circuit opens all but one of the plurality of transistors in response to the second set of drive control signals.

* * * * *